(12) United States Patent
Nemiroff et al.

(10) Patent No.: US 10,877,806 B2
(45) Date of Patent: Dec. 29, 2020

(54) METHOD AND APPARATUS FOR SECURELY BINDING A FIRST PROCESSOR TO A SECOND PROCESSOR

(71) Applicant: Intel Corporation, Santa Clara, CA (US)

(72) Inventors: Daniel Nemiroff, El Dorado Hills, CA (US); Jason W. Brandt, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 430 days.

(21) Appl. No.: 15/622,113

(22) Filed: Jun. 14, 2017

(65) Prior Publication Data

US 2018/0365069 A1     Dec. 20, 2018

(51) Int. Cl.
| | | |
|---|---|---|
| *G06F 11/30* | (2006.01) | |
| *G06F 12/14* | (2006.01) | |
| *G06F 9/50* | (2006.01) | |
| *H04L 9/08* | (2006.01) | |

(52) U.S. Cl.
CPC .......... *G06F 9/5027* (2013.01); *H04L 9/0822* (2013.01); *H04L 9/0844* (2013.01); *H04L 9/0869* (2013.01); *H04L 9/0877* (2013.01); *H04L 9/0894* (2013.01)

(58) Field of Classification Search
CPC ... H04L 9/0844; H04L 9/0822; H04L 9/0894; H04L 9/0877; H04L 9/0869
See application file for complete search history.

(56) References Cited

U.S. PATENT DOCUMENTS

| | | | | |
|---|---|---|---|---|
| 8,295,490 B1* | 10/2012 | McCoy | ................. | H04L 9/0894 380/279 |
| 8,850,227 B1* | 9/2014 | Krahn | ..................... | G06F 21/57 380/277 |
| 8,867,743 B1* | 10/2014 | Salvaji | .................. | H04L 9/0869 380/260 |
| 2002/0112166 A1* | 8/2002 | Jakobsson | ............. | H04L 9/0894 713/181 |
| 2006/0259782 A1* | 11/2006 | Wang | ...................... | G06F 21/62 713/189 |
| 2007/0050567 A1* | 3/2007 | Murakami | ............ | G06F 9/3004 711/150 |
| 2008/0080708 A1* | 4/2008 | McAlister | ............. | H04L 9/0822 380/44 |
| 2011/0055560 A1* | 3/2011 | Meissner | .............. | G06F 21/602 713/166 |
| 2012/0036370 A1* | 2/2012 | Lim | ...................... | H04L 9/0822 713/189 |

(Continued)

OTHER PUBLICATIONS

Gueron, Shay, "Intel Advanced Encryption Standard (AES) New Instructions Set," Intel Corporation, White Paper—Revision 3.01, Sep. 2012; 94 pages.

*Primary Examiner* — Fatoumata Traore
*Assistant Examiner* — Kevin Ayala
(74) *Attorney, Agent, or Firm* — Alliance IP, LLC

(57) ABSTRACT

In one embodiment, an apparatus comprises a first processor to generate a first cryptographic key in response to a request from a software application; receive a second cryptographic key generated by a second processor; encrypt the first cryptographic key using the second cryptographic key; and provide the encrypted first cryptographic key for use by the software application.

13 Claims, 12 Drawing Sheets

(56) References Cited

U.S. PATENT DOCUMENTS

| | | | |
|---|---|---|---|
| 2012/0173885 A1* | 7/2012 | Acar | H04L 9/0877 |
| | | | 713/193 |
| 2017/0063547 A1* | 3/2017 | Brandt | H04L 9/0894 |
| 2017/0230344 A1* | 8/2017 | Dhar | H04L 63/0435 |
| 2017/0372085 A1* | 12/2017 | Howe | G06F 21/62 |
| 2018/0287785 A1* | 10/2018 | Pfannenschmidt | H04L 9/0822 |
| 2019/0081776 A1* | 3/2019 | Satou | H04L 9/0825 |

* cited by examiner

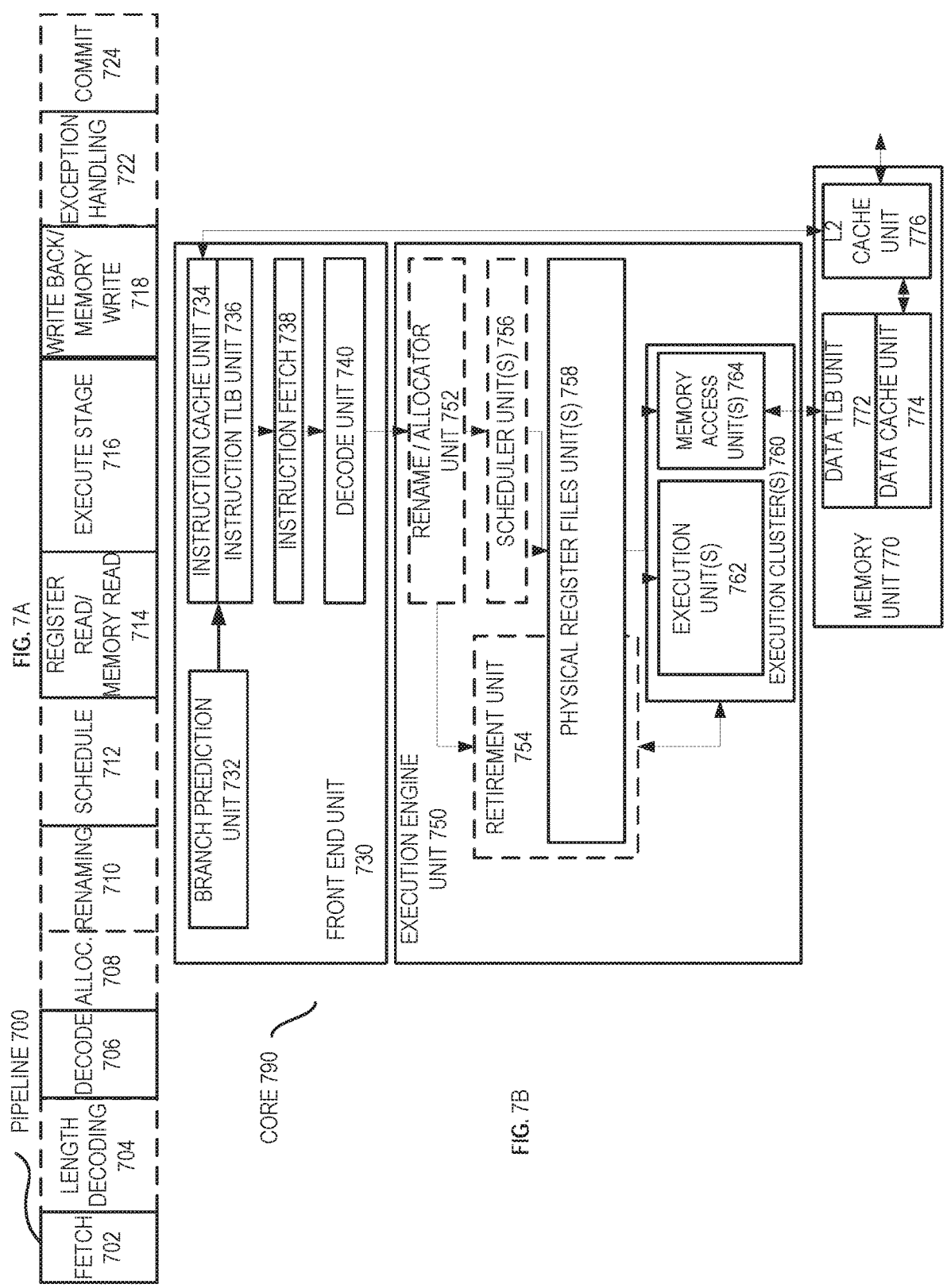

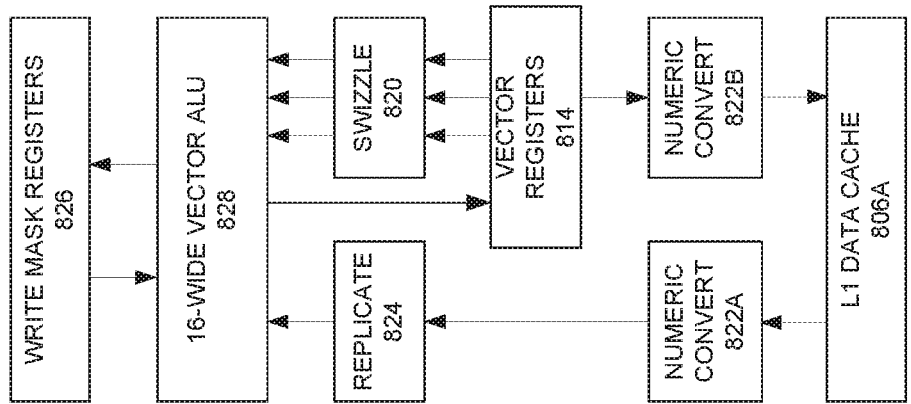
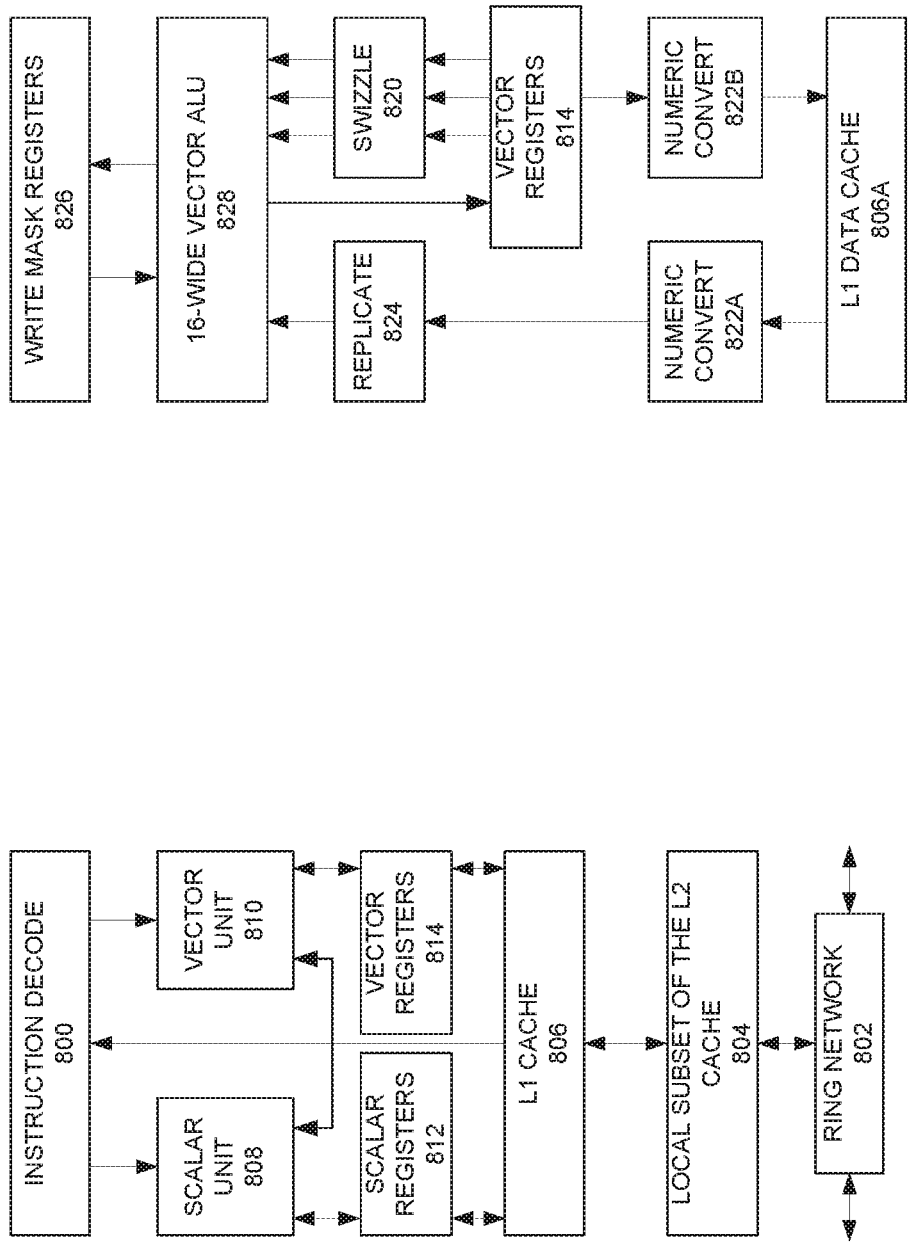

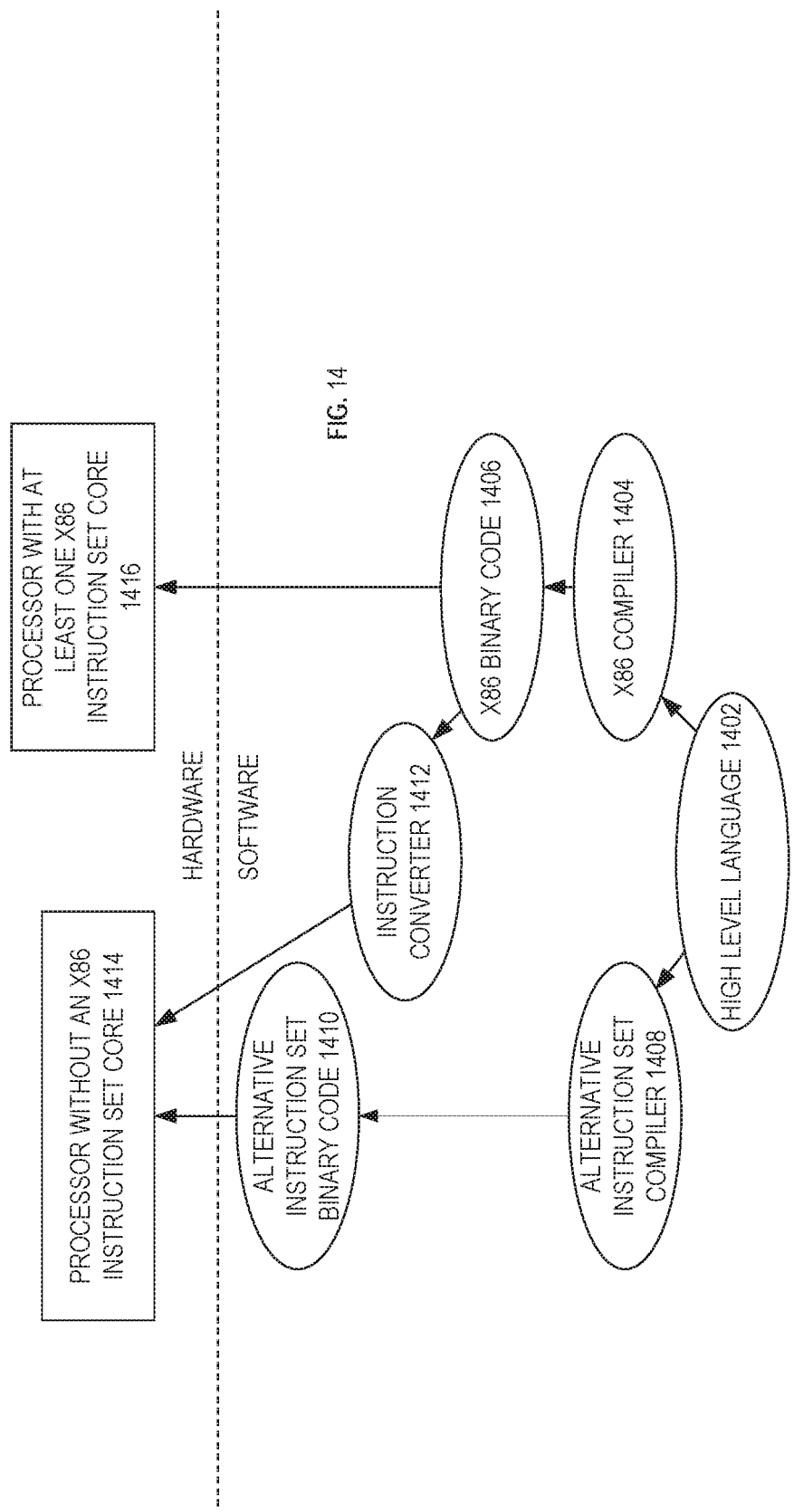

US 10,877,806 B2

METHOD AND APPARATUS FOR SECURELY BINDING A FIRST PROCESSOR TO A SECOND PROCESSOR

FIELD

The present disclosure relates in general to the field of computer development, and more specifically, to data security.

BACKGROUND

A computing system may include one or more processors, one or more memory devices, and/or one or more communication controllers, among other components. Logic of the computing system may be operable to encrypt and/or decrypt data.

BRIEF DESCRIPTION OF THE DRAWINGS

FIG. 7A is a block diagram illustrating both an exemplary in-order pipeline and an exemplary register renaming, out-of-order issue/execution pipeline in accordance with certain embodiments;

FIG. 7B is a block diagram illustrating both an exemplary embodiment of an in-order architecture core and an exemplary register renaming, out-of-order issue/execution architecture core to be included in a processor in accordance with certain embodiments;

FIGS. 8A-B illustrate a block diagram of a more specific exemplary in-order core architecture, which core would be one of several logic blocks (potentially including other cores of the same type and/or different types) in a chip in accordance with certain embodiments;

FIG. 14 is a block diagram contrasting the use of a software instruction converter to convert binary instructions in a source instruction set to binary instructions in a target instruction set in accordance with certain embodiments.

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
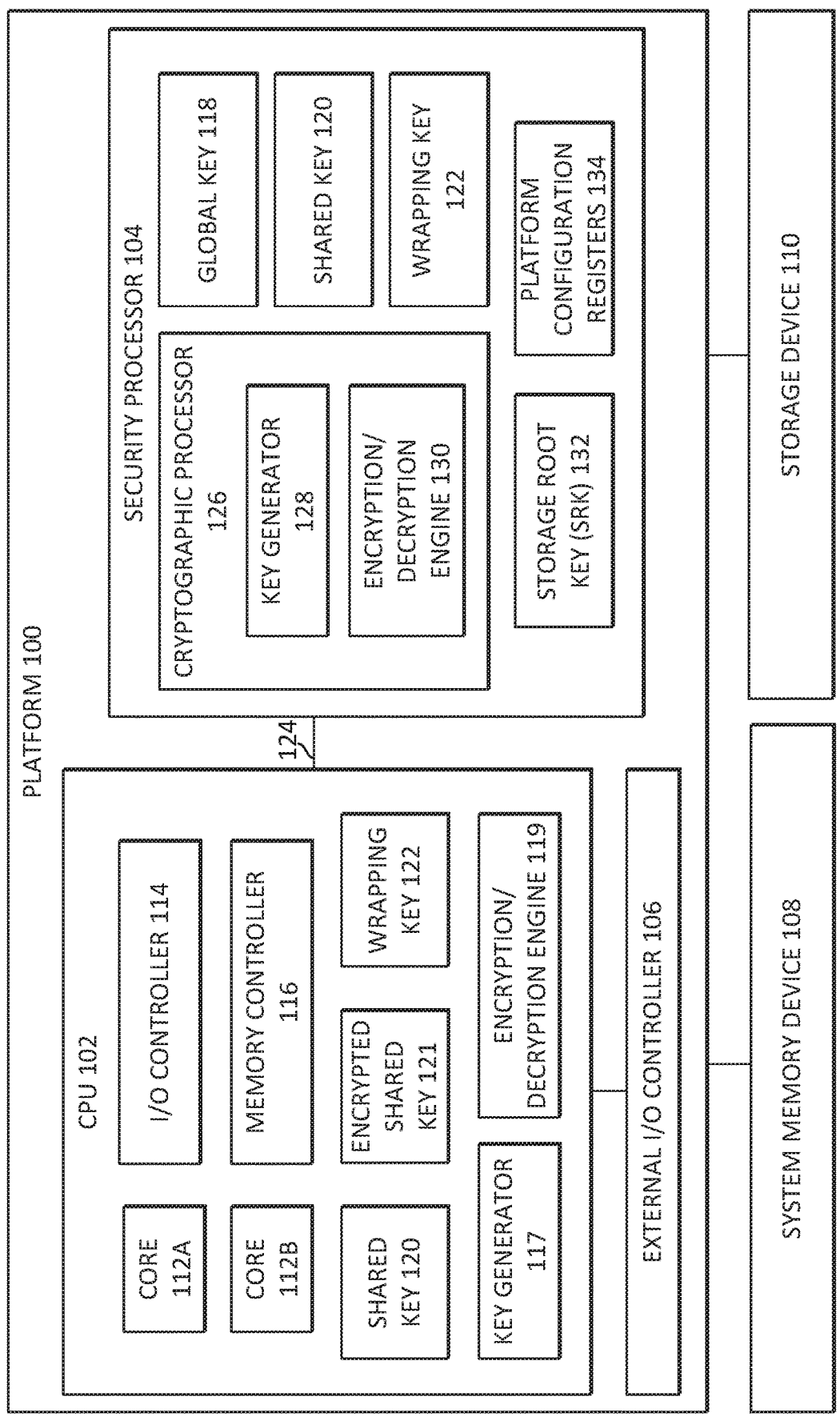
FIG. 1 is a block diagram of a platform comprising a central processing unit (CPU) and a security processor in accordance with certain embodiments.

FIG. 1 illustrates a block diagram of an example platform 100 comprising a central processing unit (CPU) 102 and a security processor 104 in accordance with certain embodiments. Platform 100 also includes an external I/O controller 106. Platform 100 is coupled to system memory device 108 and storage device 110.

A software application running on platform 100 (e.g., instructions of the application may be executed by CPU 102) may request that the CPU perform cryptographic operations on its behalf. For example, the application may request that the processor encrypt or decrypt data. Data may be encrypted or decrypted by a CPU in any suitable manner. For example, the CPU may perform instructions of an Advanced Encryption Standard (AES), AES-New Instructions (NI), similar instruction set, or other suitable instructions that implement any suitable cryptographic algorithms. For example, an instruction may include or reference (e.g., include an address of) data to be encrypted or decrypted and include or reference a cryptographic key to be used to encrypt or decrypt the data. A memory location referenced by an instruction may be any suitable memory location, such as a location in system memory device 108 or other suitable memory location. While such instructions may accelerate the performance of cryptographic operations, if an instruction references a cryptographic key that is stored in clear text (i.e., an unencrypted form) in system memory device or other memory location, the system may be vulnerable to an attack that maliciously accesses the key (e.g., from the system memory device or from a communication bus of the platform).

Security may be improved through configuring the CPU to execute an instruction with a pointer to a wrapped key (i.e., an encrypted key) stored in memory rather than a clear text key. For example, when a CPU boots, it may generate a random number which is used as a wrapping key. A software application that uses the AES-NI instruction set or other instructions related to cryptography can pass a clear text key to the CPU and the CPU will encrypt that key with the wrapping key and return it to the software application as a handle to be used by the software application when calling a cryptographic instruction. Thus, instead of passing a pointer to an encryption key stored in clear text, the software application will pass a pointer to the handle (i.e., wrapped key). While the key is no longer in the clear in the memory at the time an instruction referencing the key is executed, there is still be a period of time in which the key is in clear text and vulnerable to attack. For example, before requesting the CPU for the handle (i.e., wrapped key), the software application may store the key in clear text in memory (e.g., the instruction requesting the wrapped key may include a pointer to the key in clear text) to allow the CPU 102 to access the key prior to encrypting the key. Thus, although the key is not exposed each time an encryption or decryption instruction is executed, the key is still exposed in clear text and thus potentially vulnerable to attack.

Various embodiments of the present disclosure provide a method to securely bind (i.e., share a cryptographic secret between) a CPU 102 and a security processor 104. Such binding may include wrapping a key by the security processor 104 and including or referencing the wrapped key in encryption and decryption instructions without the key ever being stored in clear text outside of the security processor 104. Thus, in various embodiments, the key is never stored in the clear on system memory device 108 or sent in the clear on a communication bus outside of the security processor 104. Particular embodiments may provide various advantages over other methods for binding a CPU and a security processor, such as one in which an original equipment manufacturer (OEM) creates and stores a secret with a secure virtual machine monitor (VMM) and a security processor running on the same platform. For example, various embodiments of the present disclosure do not rely on a VMM, do not require the OEM to be in the trust boundary, and do not expose the shared secret to dynamic random access memory (DRAM) or other system memory or communication busses (e.g., Direct Media Interface (DMI), Serial Peripheral Interface (SPI), Low Pin Count (LPC) or other suitable bus) coupled to the CPU 102, security processor 104, or system memory device 108.

Once security processor 104 and CPU 102 are bound together by a shared wrapping key, a key generated by the security processor 104 (e.g., a key to be used by a software application when requesting the CPU to execute cryptographic instructions) may be directly injected into the CPU without ever appearing to malware. Moreover, the binding may allow the security processor 104 and the CPU 102 to attest to being on the same platform, thus preventing a situation where an attacker may redirect commands from a CPU on one platform to a security processor 104 on another platform.

Platform 100 includes a CPU 102 coupled to a security processor 104, an external input/output (I/O) controller 106, a system memory device 108, and storage device 110. CPU 102 comprises a processor, such as a microprocessor, an embedded processor, a DSP, a network processor, a handheld processor, an application processor, a co-processor, an SOC, or other device to execute code (i.e., software instructions). In the depicted embodiment, CPU 102 includes two processing elements (cores 112A and 112B), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 112 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 114 is an integrated I/O controller that includes logic for communicating data between CPU 102 and I/O devices, which may refer to any suitable logic capable of transferring data to and/or receiving data from an electronic system, such as CPU 102. For example, an I/O device may comprise a controller of an audio/video (A/V) device such as a graphics accelerator; a controller of a data storage device (e.g., storage device 110), such as a solid state driver (SSD), hard disk drive (HDD), a non-volatile dual in-line memory module (NVDIMM), or optical storage disk; a wireless transceiver; a network processor; a network interface controller; or a controller for another input device such as a monitor, printer, mouse, keyboard, or scanner; or other suitable device.

An I/O device may communicate with the I/O controller 114 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), Institute of Electrical and Electronics Engineers (IEEE) 802.3, IEEE 802.11, or other current or future signaling protocol. In particular embodiments, I/O controller 114 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 102) or may be integrated on the same chip as the CPU 102.

Memory controller 116 is an integrated memory controller that includes logic to control the flow of data going to and from one or more system memory devices 108. Memory controller 116 may include logic operable to read from a system memory device 108, write to a system memory device 108, or to request other operations from a system memory device 108. In various embodiments, memory controller 116 may receive write requests from cores 112 and/or I/O controller 114 and may provide data specified in these requests to a system memory device 108 for storage therein. Memory controller 116 may also read data from a system memory device 108 and provide the read data to I/O controller 114 or a core 112. During operation, memory controller 116 may issue commands including one or more addresses of the system memory device 108 in order to read data from or write data to memory (or to perform other operations). In some embodiments, memory controller 116 may be implemented on the same chip as CPU 102, whereas in other embodiments, memory controller 116 may be implemented on a different chip than that of CPU 102. I/O controller 114 may perform similar operations with respect to one or more storage devices 110.

CPU 102 may also store various keys in any suitable memory. In the embodiment depicted, CPU 102 stores a shared key 120, an encrypted shared key 121, and a wrapping key 122. These keys will be discussed in more detail below. In general, a key is a string of bits that is used by a cryptographic algorithm to encrypt or decrypt data (e.g., transform clear text into cipher text or vice versa). In the various embodiments described herein, symmetric or asymmetric keys may be used. Encryption algorithms which use the same key (i.e., a symmetric key) for both encryption and decryption are known as symmetric key algorithms, while encryption algorithms which use a first key for encryption and a second key for decryption are known as asymmetric key algorithms. Thus, when a common key (e.g., shared key 120 or wrapping key 122) is shown as being stored by multiple entities (e.g., CPU 102 and security processor 104), this may represent the same symmetric key being stored at each entity or related asymmetric keys being stored at the entities (e.g., the key used for encryption is stored at one entity and the corresponding key used for decryption is stored at the other entity).

Key generator 117 may include a random number generator that produces random numbers and logic that uses the random numbers to construct keys for cryptographic functions (in various embodiments the random numbers themselves may be used as keys or may be processed to generate keys). The random numbers and/or keys generated by key generator 117 may be any suitable length. In a particular embodiment, the random numbers are 256 bits long. Key generator 117 may be operable to generate any suitable keys, such as wrapping key 122.

Encryption/decryption engine 119 may receive data (which in some situations may be a cryptographic key) and a cryptographic key as input and generate encrypted data or decrypted data as output. Encryption/decryption engine 119 may implement any suitable cryptographic algorithms, such as an RSA algorithm or other suitable algorithm. Encryption/decryption engine 119 may encrypt any suitable keys, such as shared key 120 and wrapping key 122. In a particular embodiment, encryption/decryption engine 119 may also encrypt and/or decrypt data referenced in instructions executed by CPU 102 (or a separate encryption/decryption engine may be used to provide such functionality). In various embodiments, key generator 117 and/or encryption decryption engine 119 may be standalone logic or may be integrated with one or more other components of CPU 102 (e.g., core 112A).

The CPU 102 may also be coupled to one or more other I/O devices (such as any of those listed above or other suitable I/O devices) through external I/O controller 106. In a particular embodiment, external I/O controller 106 may couple a storage device 110 to the CPU 102. External I/O controller 106 may include logic to manage the flow of data between one or more CPUs 102 and I/O devices. In particular embodiments, external I/O controller 106 is located on the same printed circuit board (e.g., a motherboard) along with the CPU 102. The external I/O controller 106 may exchange information with components of CPU 102 using point-to-point or other interfaces.

System memory device 108 may store any suitable data, such as data used or generated by CPU 102 or security processor 104 to provide the functionality of platform 100. For example, data associated with software applications that are executed by or files accessed by cores 112 may be stored in system memory device 108. Thus, a system memory device 108 may include a system memory (sometimes referred to as a main memory) that stores data and/or sequences of instructions that are executed or otherwise used by the cores 112. A system memory device 108 may be dedicated to a particular CPU 102 or shared with other devices (e.g., one or more other CPUs or other devices) of platform 100. In various embodiments, a system memory device 108 may include a memory comprising any number of memory modules, a memory device controller, and other supporting logic (not shown). A memory module may include non-volatile memory and/or volatile memory.

Non-volatile memory is a storage medium that does not require power to maintain the state of data stored by the medium. In various embodiments, non-volatile memory may be byte or block addressable. Nonlimiting examples of nonvolatile memory may include any or a combination of: solid state memory (such as planar or 3-dimensional (3D) NAND flash memory or NOR flash memory), 3D crosspoint memory, memory that uses chalcogenide phase change material (e.g., chalcogenide glass), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In some embodiments, any portion of system memory 108 can comply with one or more Joint Electron Device Engineering Council (JEDEC) standards including but not limited to Double Data Rate (DDR) standards, e.g., DDR3, 4, and 5, or Low Power DDR4 (LPDDR4) as well as emerging standards.

A storage device 110 may store any suitable data, such as data used by CPU 102 to provide functionality of platform 100. For example, data associated with software applications that are executed by or files accessed by cores 112A and 112B may be stored in storage device 110. In various embodiments, a storage device 110 may store persistent data (e.g., a user's files or software application code) that maintains its state even after power to the storage device 110 is removed. A storage device 110 may be dedicated to CPU 102 or shared with other devices (e.g., another CPU or other device) of platform 100.

Security processor 104 may be any suitable processor capable of generating cryptographic keys, securely storing one or more keys, performing one or more encryption algorithms, and/or performing one or more decryption algorithms. In a particular embodiment, security processor 104 may be a dedicated microcontroller designed to secure hardware by integrating cryptographic keys into devices. In one embodiment, security processor 104 is or comprises a trusted platform module (TPM) that is compliant with a version of a TPM specification (e.g., Trusted Platform Module Library Specification Revision 01.16 or other TPM specification published by the Trusted Computing Group). Accordingly, security processor 104 may include any one or more components described in such specifications.

In various embodiments, security processor 104 may be used in conjunction with a disk encryption software application (e.g., SecureDoc, dm-crypt, BitLocker Drive Encryption, or other software application that encrypts data) to generate and/or store cryptographic keys used by the software application to encrypt data for storage in storage device 110 (which in various embodiments may be a hard disk drive or solid state drive).

In a particular embodiment, a first integrated circuit (e.g., chip) comprises security processor 104 and a second integrated circuit (e.g., chip) comprises CPU 102. In a particular embodiment, security processor 104 is embodied in a first semiconductor package and CPU 102 is embodied in a second semiconductor package. In a particular embodiment, the manufacturer of the CPU 102 is different from the manufacturer of the security processor 104, though in another embodiment a common entity may manufacture both the CPU 102 and security processor 104. A semiconductor package and/or integrated circuit that includes security processor 104 may be dedicated to security processor 104 or may include other computing logic (e.g., a security processor 104 may be integrated into external I/O controller 106). In a particular embodiment, security processor 104 may be implemented in firmware (e.g., the security processor 104 may be run within a CPU's trusted execution environment). In a particular embodiment, the security processor 104 may comprise a trusted execution engine.

In the embodiment depicted, security processor 104 includes cryptographic processor 126 which includes key generator 128 and encryption/decryption engine 130. Security processor 104 also securely stores any suitable keys, including global key 118, shared key 120, wrapping key 122, and storage root key (SRK) 132. Security processor 104 also includes platform configuration registers 134.

Key generator 128 may include a random number generator that produces random numbers and logic that uses the random numbers to construct keys for cryptographic functions (in various embodiments the random numbers themselves may be used as keys or may be processed to generate keys). In some embodiments, the random numbers may also be used to provide cryptographic nonces. The random numbers and/or keys generated by key generator 128 may be any suitable length. In a particular embodiment, the random numbers are 256 bits long.

Encryption/decryption engine 130 may receive data and a cryptographic key as input and generate encrypted data or decrypted data as output. Encryption/decryption engine 130 may implement any suitable cryptographic algorithms, such as an RSA algorithm or other suitable algorithm.

Global key 118, shared key 120, and wrapping key 122 will be described in more detail below. Storage root key 132 may form the basis of a key hierarchy that manages secure storage. This key hierarchy may allow data (including keys) to be encrypted such that they can only be decrypted by accessing the security processor 104 which uses the storage root key 132 for the decryption (in an embodiment, the storage root key 132 is generated by the security processor 104 (or the security processor is provisioned with the storage root key), is not communicated to any other device, and/or may only be accessed by demonstration of knowledge of a shared secret.). For example, a storage key for a software application (referred to herein as a software key) may be generated and/or encrypted by the security processor 104 and then stored external to the security processor 104 (e.g., in system memory device 108 and/or storage device 110) or within the security processor 104. When the key is to be accessed, the encrypted key (or a reference to the key) is passed to the security processor 104 and decrypted by the security processor 104 using the storage root key 132. In various embodiments, the storage root key 132 is stored in non-volatile memory of the security processor 104.

Platform configuration registers 134 may be used to store integrity metrics, that measure the integrity of code, typically before the code is executed. In various embodiments, the platform configuration registers are reset whenever the system loses power or re-starts. In particular embodiments, platform configuration registers 134 may store policies associated with keys generated by and/or stored by the security processor 104.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in security processor 104 may be located on a single chip or on multiple chips. In a particular embodiment, CPU 102 is located on a first semiconductor package coupled to a circuit board and security processor 104 is located on a second semiconductor package coupled to the circuit board.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments an integrated I/O subsystem includes point-to-point multiplexing logic between various components of platform 100, such as cores 112, memory controller 116, I/O controller 114, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 110 may be communicably coupled through a network.

In the embodiment depicted, security processor 104 is coupled to CPU 102 via a sideband bus 124. Sideband bus 124 may comprise a physical bus or a virtual bus that is dedicated to communication between the CPU 102 and the security processor 104. In a particular embodiment, sideband bus is a virtual bus implemented using a physical bus that is coupled to the CPU and multiple components of the platform 100. In a particular embodiment, communication over the bus is controlled such that certain cycles of the bus may only be used by the CPU to communicate secure data to the security processor 104. In a particular embodiment, the bus may communicate data from the CPU 102 to one or more registers that are only accessible by the security processor 104. For example, these registers may include a register dedicated to receive an encrypted version of the wrapping key 122 (i.e., no other data may be written to the register) and another register dedicated to receive the encrypted shared key 121. In various embodiments, the sideband bus 124 may couple the security processor 104 to a plurality of CPUs 102. In some embodiments, various keys described herein (e.g., shared key 120 or wrapping key 122) may be shared by multiple CPUs 102 of the platform 100.

Although not depicted, platform 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
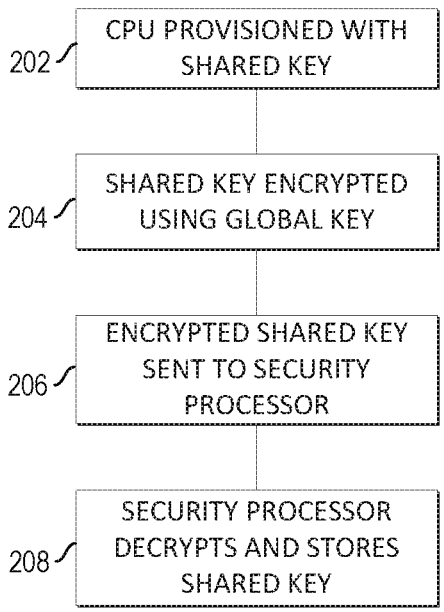
FIG. 2 is a flow for communicating a shared key to a security processor in accordance with certain embodiments.

FIG. 2 illustrates an example flow for communicating a shared key 120 to a security processor 104 in accordance with certain embodiments. In a particular embodiment, the shared key 120 may later be used to securely send the wrapping key 122 to the security processor 104. At 202, CPU 102 is provisioned with a shared key 120. In a particular embodiment, shared key 120 may be a key that is unique to a particular CPU family (i.e., each CPU 102 of a particular family is provisioned with the same shared key). The CPU 102 may be provisioned with the shared key 120 in any suitable manner. In a particular embodiment, the shared key 120 is a hardware key that is persistently stored in hardware of CPU 102. As an example, at the time of manufacture of the CPU 102, the shared key 120 may be hard coded into the logic of the CPU 102 (e.g., the shared key 120 may be designed into the logic of CPU 102, e.g., by tying signals representing the value of the shared key to power or ground or through other design methodology, or fuses of the CPU 102 may be blown based on the value of the shared key). As another example, the shared key 120 may be written to persistent storage elements of the CPU 102.

At 204, the shared key 120 is encrypted using a global key 118 associated with the security processor 104. In various embodiments, global key 118 is securely sent to third party logic that performs the encryption, such that a human never sees the global key 118. By way of explanation, the format (X)Y may be used herein to represent data X encrypted using key Y. In an embodiment, the CPU 102 may be provisioned with the result of the encryption (i.e., (shared key) global key) (depicted as the encrypted shared key 121) in a manner similar to that described above with respect to the provisioning of the CPU 102 with the shared key 120.

At 206, the encrypted shared key 121 (i.e., (shared key) global key) is sent to security processor 104. In a particular embodiment, the encrypted shared key is sent over sideband bus 124, though in other embodiments it may be sent in any suitable manner. At 208, the security processor 104 utilizes global key 118 to decrypt the shared key 120. The security processor 104 then stores the shared key 120 within memory of the security processor 104. In a particular embodiment, the security processor 104 may be provisioned with the global key 118 at any suitable time (e.g., prior to the communication of the encrypted shared key and/or at the time of manufacture of the security processor 104).

In another embodiment, the shared key 120 may be communicated by the manufacturer of the CPU 102 to the manufacturer of the security processor 104 for provisioning in the security processor 104. However, this may increase the exposure of the shared key 120 slightly.

Figure 3:
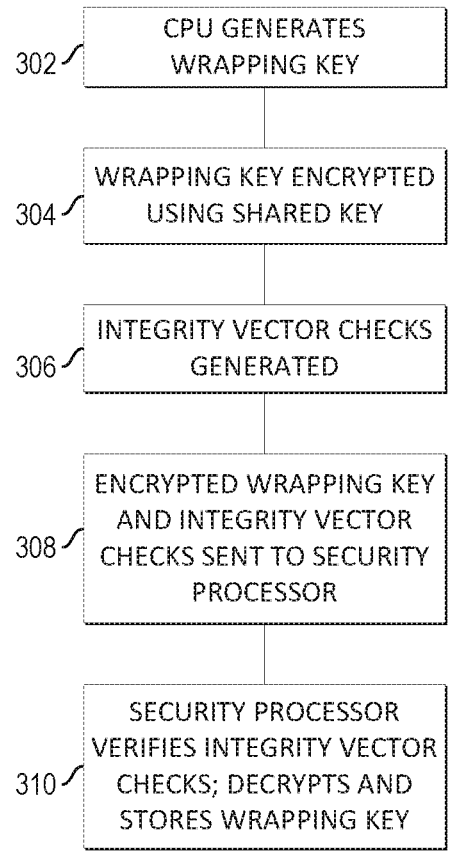
FIG. 3 is a flow for communicating a wrapping key to a security processor in accordance with certain embodiments.

FIG. 3 illustrates an example flow for communicating a wrapping key 122 to a security processor 104 in accordance with certain embodiments. In a particular embodiment, the flow of FIG. 3 is performed after the security processor has received and decrypted the shared key. At 302, CPU 102 generates a wrapping key 122 comprising any suitable cryptographic key. The wrapping key 122 may be generated in any suitable manner. For example, CPU 102 may utilize a random number generator or other suitable logic of the CPU 102 to generate the wrapping key 122.

At 304, the wrapping key 122 is encrypted by the CPU 102 using the shared key 120 to generate (wrapping key) shared key. At 306, one or more integrity vector checks associated with the encrypted wrapping key are generated. Any suitable encryption mode may be used to encrypt the wrapping key. In various embodiments, AES, AES-Galois/Counter Mode (GCM), AES-GCM-Synthetic Initialization Vector (SIV), hash message authentication code (HMAC), or other suitable encryption mode may be used. Similarly, any suitable encryption modes may be used during any other encryption operations described herein (whether the action is performed by the CPU 102 or security processor 104). The integrity vector checks may include a series of bits of any suitable length (e.g., 128 bits, 256 bits, etc.) that are generated in conjunction with the encryption to protect the integrity of the encrypted wrapping key. The integrity vector checks may be passed to the logic that decrypts the wrapping key and will indicate whether the encrypted wrapping key has been changed prior to reception by the decryption logic.

At 308, the encrypted wrapping key and integrity vector checks are sent to security processor 104. In an embodiment, the encrypted wrapping key and integrity vector checks are sent over sideband bus 124 from the CPU 102 to the security processor 104, though in other embodiments they may be communicated using any suitable medium.

At 310, the security processor 104 verifies the integrity vector checks and then decrypts and stores the wrapping key 122. For example, the encrypted wrapping key and the shared key may be supplied to encryption/decryption engine 130 and the engine 130 may use the shared key to decrypt the wrapping key. The wrapping key 122 is then stored securely by security processor 104. In the event that the integrity vector checks fail, the encrypted wrapping key may be discarded.

Figure 4:
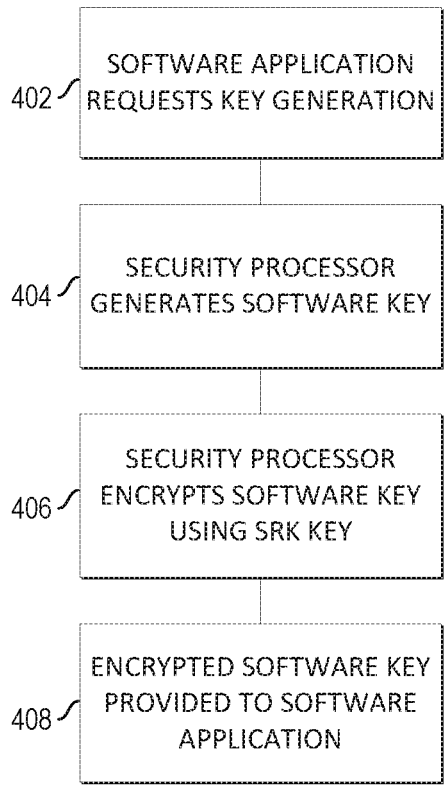
FIG. 4 is a flow for generating and storing a key for a software application in accordance with certain embodiments.

FIG. 4 illustrates an example flow for generating and storing a key for a software application in accordance with certain embodiments. The key generated in this flow may be a key referenced in processor instructions related to cryptography (e.g., AES-NI instructions) that may be called by the software application.

At 402, a software application requests generation of a key (a key generated for use by a software application will be referred to herein as a "software key"). For example, the software application may request that the security processor 104 generate the key. In a particular embodiment, the software application may communicate with the security processor 104 via a device driver implemented by an operating system running on platform 100. In various embodiments, the request to generate the key may also include one or more policies to be applied to the software key. In one embodiment, the policies may include at least one policy that prevents the first cryptographic key from being sent by the security processor 104 in an unencrypted format. Other example policies include a policy that the software key can only be accessed if proper authentication data (e.g., a password and/or pin that has to be typed by the user of the software application) is provided, a policy that access to the software key is restricted to one or more particular time windows, or a policy that the software key can only be sent to the CPU 102. In a particular embodiment, the key is created via a createobject request (e.g., when the security processor 104 comprises a TPM).

At 404, the security processor 104 generates the requested key using, e.g., key generator 128. In a particular embodiment, the key may be generated by utilizing a random number generator of the key generator 128.

At 406, the security processor 104 encrypts the software key using the storage root key 132. For example, the software key may be used as the data input and the storage root key 132 may be used as the key input to encryption/decryption engine 130 to output an encrypted software key: (software key) wrapping key. The encrypted software key is provided to the software application at 408. The encrypted software key may be made available to the software application in any suitable manner. In a particular embodiment, the encrypted software key is written to system memory device 108 (e.g., DRAM). In a particular embodiment, if the software is not going to immediately use the software key, the software key may be written to storage device 110. As an alternative, the encrypted software key may be securely stored by the security processor 104 in lieu of sending the encrypted software key to the system memory device 108. In various embodiments, the software key may be stored unencrypted by the security processor 104 (but the security processor 104 may require valid authentication data from an entity requesting the use of the software key).

Figure 5:
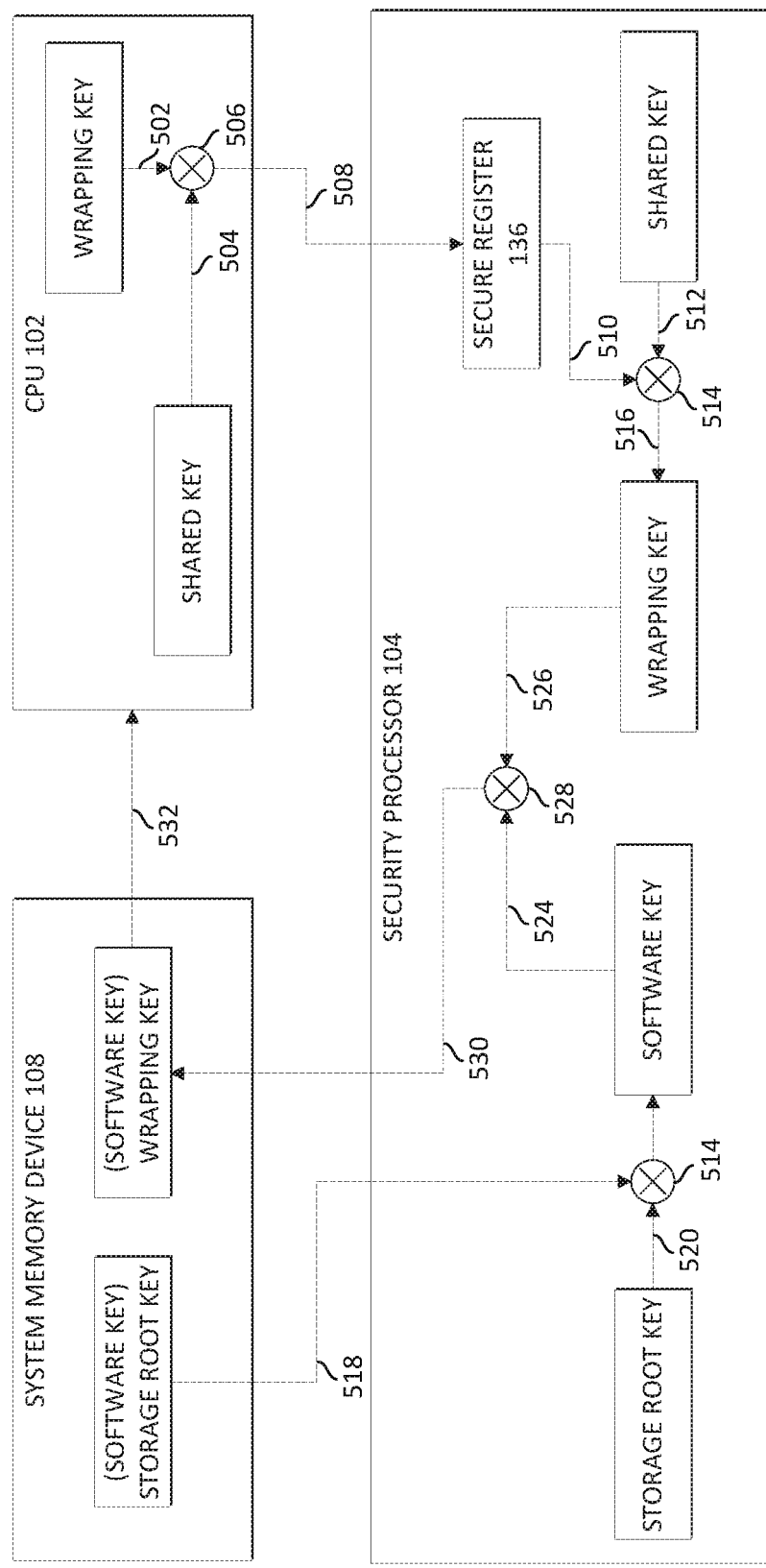
FIG. 5 depicts communications between a CPU, security processor, and system memory device in accordance with certain embodiments.

FIG. 5 illustrates example communications between a CPU 102, security processor 104, and system memory device 108 in accordance with certain embodiments. The various communications depicted result in the software key being provided to the CPU 102 without ever being in the clear outside of the security processor 104.

The portion of FIG. 5 depicting the communication of the wrapping key to the security processor 104 may generally correspond to the flow of FIG. 3. In communications 502 and 504, the wrapping key generated by the CPU 102 and the shared key are provided to encryption logic 506. Encryption logic 506 encrypts the wrapping key to generate (wrapping key) shared key. At communication 508, the encrypted wrapping key is sent to the security processor 104 (e.g., over a sideband bus 124 or other communication medium). The encrypted wrapping key is stored in a secure register 136 of the security processor 104. At any suitable time (e.g., when the wrapping key is needed for an operation), communication 510 sends the encrypted wrapping key to decryption logic 514 and communication 512 sends the shared key to decryption logic 514. In a particular embodiment, decryption logic 514 comprises at least a portion of the encryption/decryption engine 130. The encrypted wrapping key is provided as the data and the shared key is provided as the key for the decryption operation and the result is the wrapping key.

As described above in connection with FIG. 4, a software application may request the generation of a software key from the security processor 104. After the software key is generated and encrypted, it may be stored in storage device 110, system memory device 108, and/or security processor 104. When the software application is ready to request performance of a cryptographic instruction (e.g., an AES-NI or similar instruction) by the CPU 102, the software application may cause the encrypted software key (i.e., (software key) storage root key) to be loaded into the system memory device 108 (e.g., from storage device 110). In communication 518, the encrypted software key is passed to the security processor 104 and made available to decryption logic 514. At communication 520, the storage root key is also made available to the decryption logic 514. The encrypted software key is provided as the data and the storage root key is provided as the key for the decryption operation and the result is the software key. In various embodiments, prior to decrypting the software key, the security processor 104 may require the software application to provide one or more authentication tokens to verify that the software application has permission to access the software key.

At communication 524, the decrypted software key is provided as the input data to encryption logic 528. In a particular embodiment, encryption logic 528 comprises at least a portion of the encryption/decryption engine 130. At communication 526, the wrapping key is provided as the input key to encryption logic 528. The result of the encryption operation, i.e., (software key) wrapping key is then sent to the system memory device 108 (or other memory accessible by CPU 102) at communication 530. At communication 532, the encrypted software key is accessed by the CPU 102. Because the CPU 102 stores the wrapping key, the CPU 102 may decrypt the encrypted software key and utilize the software key to perform a cryptographic instruction requested by the software application. In this manner, the software key is made available to the CPU 102 without ever exposing the software key in a clear text format outside of the security processor 104.

Figure 6:
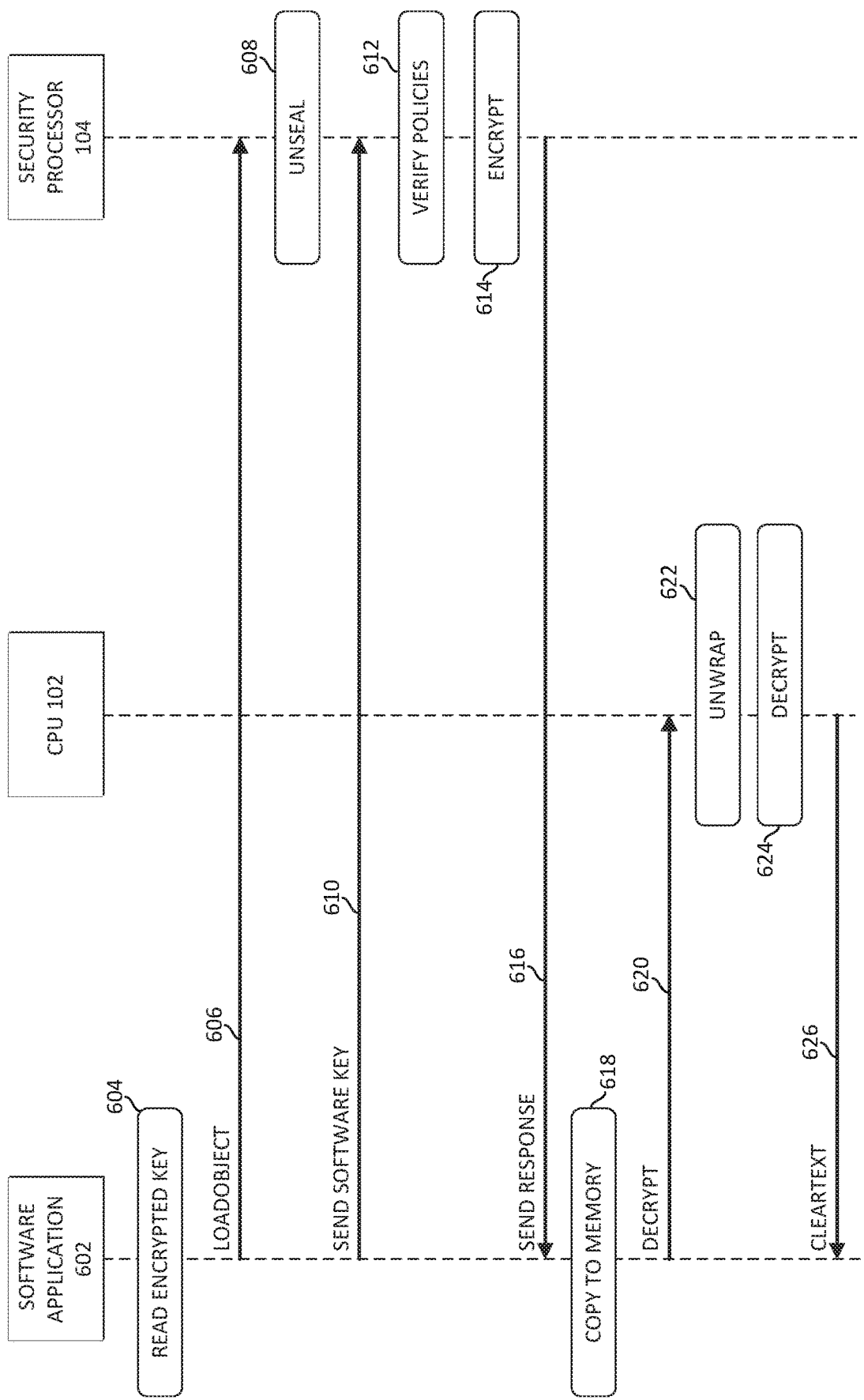
FIG. 6 is a flow for securely requesting decryption of encrypted data in accordance with certain embodiments.

FIG. 6 illustrates an example flow for securely requesting decryption of encrypted data in accordance with certain embodiments. At 604, an encrypted software key is read (e.g., from storage device 110 into system memory device 108). At 606, a loadobject command is sent by the software application 602 to the security processor 104. The loadobject command may include (or otherwise reference) the encrypted software key, i.e., (software key) storage root key.

At 608, the security processor 104 performs an unseal operation on the encrypted software key. This may include decrypting the encrypted software key. At 610, the software application 602 sends a send software key command 610 to the security processor 104. This command may include a reference to the software key that was referenced in the loadobject command 606. At 612, the security processor 104 checks policies associated with the software key to determine whether the software key may be provided. At 614, upon a successful verification of the policies, the software key is encrypted using the wrapping key.

At 616, a response is sent from the security processor 104 to the software application 602. The response may include (or reference a location in memory of) the encrypted software key, i.e., (software key) wrapping key. At 618, the software application 602 causes the encrypted software key to be stored in memory (e.g., the system memory device 108).

At 620, the software application requests the execution of a decryption instruction by the CPU 102. The decryption instruction may include (or otherwise reference) data to be decrypted and may include (or otherwise reference) the encrypted software key, i.e., (software key) wrapping key. At 622, the CPU 102 unwraps the software key. That is, the CPU 102 decrypts the software key by using the wrapping key as the input key and the encrypted software key as the data input into decryption logic of the CPU 102. At 624, the CPU 102 decrypts the data referenced in the decrypt instruction. This may involve supplying the data referenced in the decrypt instruction as input data and the software key as the input key to decryption logic of the CPU 102. The outcome of this operation is the decrypted data. At 626, the decrypted data is provided in a clear text format to memory (e.g., system memory device 108).

In a particular embodiment, the wrapping key 122 is stored in volatile memory of the CPU 102 while the security processor 104 stores the wrapping key 122 in persistent storage. When the CPU 102 is powered down (e.g., the CPU 102 enters a hibernation or sleep state), the volatile memory of CPU 102 that stores the wrapping key 122 may lose its state. In such a situation, the security processor 104 may communicate the wrapping key 122 to the CPU 102 (e.g., over sideband bus 124) to prevent the CPU 102 from generating a new wrapping key (and potentially corrupting data if the software application is not configured to request that the software key be wrapped in the new wrapping key. Thus on boot flows (e.g., when the CPU 102 is being booted after the platform has been powered down), the CPU 102 may generate the wrapping key 122 while on recovery from a low power state (such as standby or hibernation), the CPU 102 may reuse the wrapping key received from security processor 104.

The flows described in FIGS. 2-6 are merely representative of operations that may occur in particular embodiments. In other embodiments, additional operations may be performed. Various embodiments of the present disclosure contemplate any suitable signaling mechanisms for accomplishing the functions described herein. Some of the operations illustrated in FIGS. 2-6 may be repeated, combined, modified or omitted where appropriate. Additionally, operations may be performed in any suitable order without departing from the scope of particular embodiments.

The figures below detail exemplary architectures and systems to implement embodiments of the above. In various embodiments, the CPU 102 and/or security processor 104 may have any suitable characteristics of the processors described below. In some embodiments, one or more hardware components and/or instructions described above are emulated as detailed below, or implemented as software modules.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 7A is a block diagram illustrating both an exemplary in-order pipeline and an exemplary register renaming, out-of-order issue/execution pipeline according to embodiments of the disclosure. FIG. 7B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression and/or decompression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 8A-B illustrate a block diagram of a more specific exemplary in-order core architecture, which core would be one of several logic blocks (potentially including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to various embodiments. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments may use a different approach (e.g., use a single register set or include a communication path that allow data to be transferred between the two register files without being written and read back).

The local subset of the L2 cache 804 is part of a global L2 cache that is divided into separate local subsets (in some embodiments one per processor core). Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. In a particular embodiment, each ring data-path is 1012-bits wide per direction.

FIG. 8B is an expanded view of part of the processor core in FIG. 8A according to embodiments. FIG. 8B includes an L1 data cache 806A (part of the L1 cache 806), as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
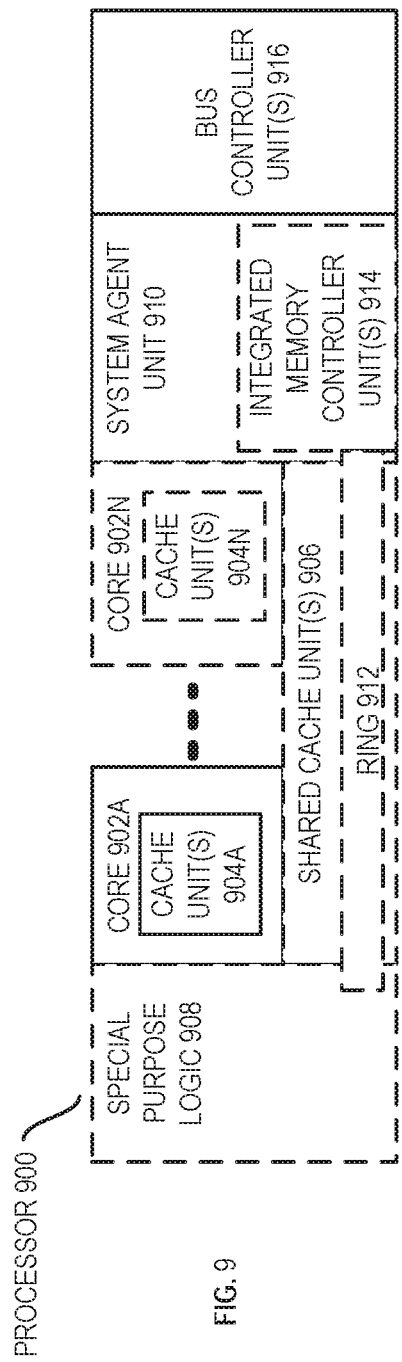
FIG. 9 is a block diagram of a processor that may have more than one core, may have an integrated memory controller, and may have integrated graphics in accordance with certain embodiments.

FIG. 9 is a block diagram of a processor 900 that may have more than one core, may have an integrated memory controller, and may have integrated graphics according to various embodiments. The solid lined boxes in FIG. 9 illustrate a processor 900 with a single core 902A, a system agent 910, and a set of one or more bus controller units 916; while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, or a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 900 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic (e.g., integrated graphics logic) 908, the set of shared cache units 906, and the system agent unit 910/ integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of executing the same instruction set, while others may be capable of executing only a subset of that instruction set or a different instruction set.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 10:
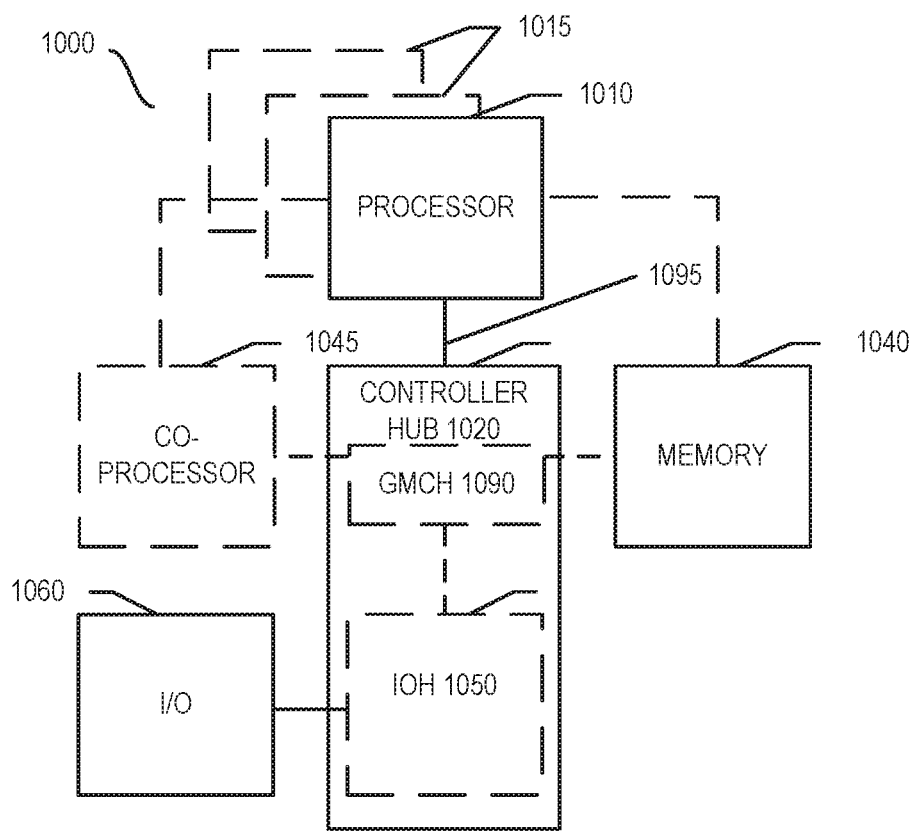
FIGS. 10, 11, 12, and 13 are block diagrams of exemplary computer architectures in accordance with certain embodiments.

FIG. 10 depicts a block diagram of a system 1000 in accordance with one embodiment of the present disclosure. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips or the same chip); the GMCH 1090 includes memory and graphics controllers coupled to memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 is a single chip comprising the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), other suitable memory, or any combination thereof. The memory 1040 may store any suitable data, such as data used by processors 1010, 1015 to provide the functionality of computer system 1000. For example, data associated with programs that are executed or files accessed by processors 1010, 1015 may be stored in memory 1040. In various embodiments, memory 1040 may store data and/or sequences of instructions that are used or executed by processors 1010, 1015.

In at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression and/or decompression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
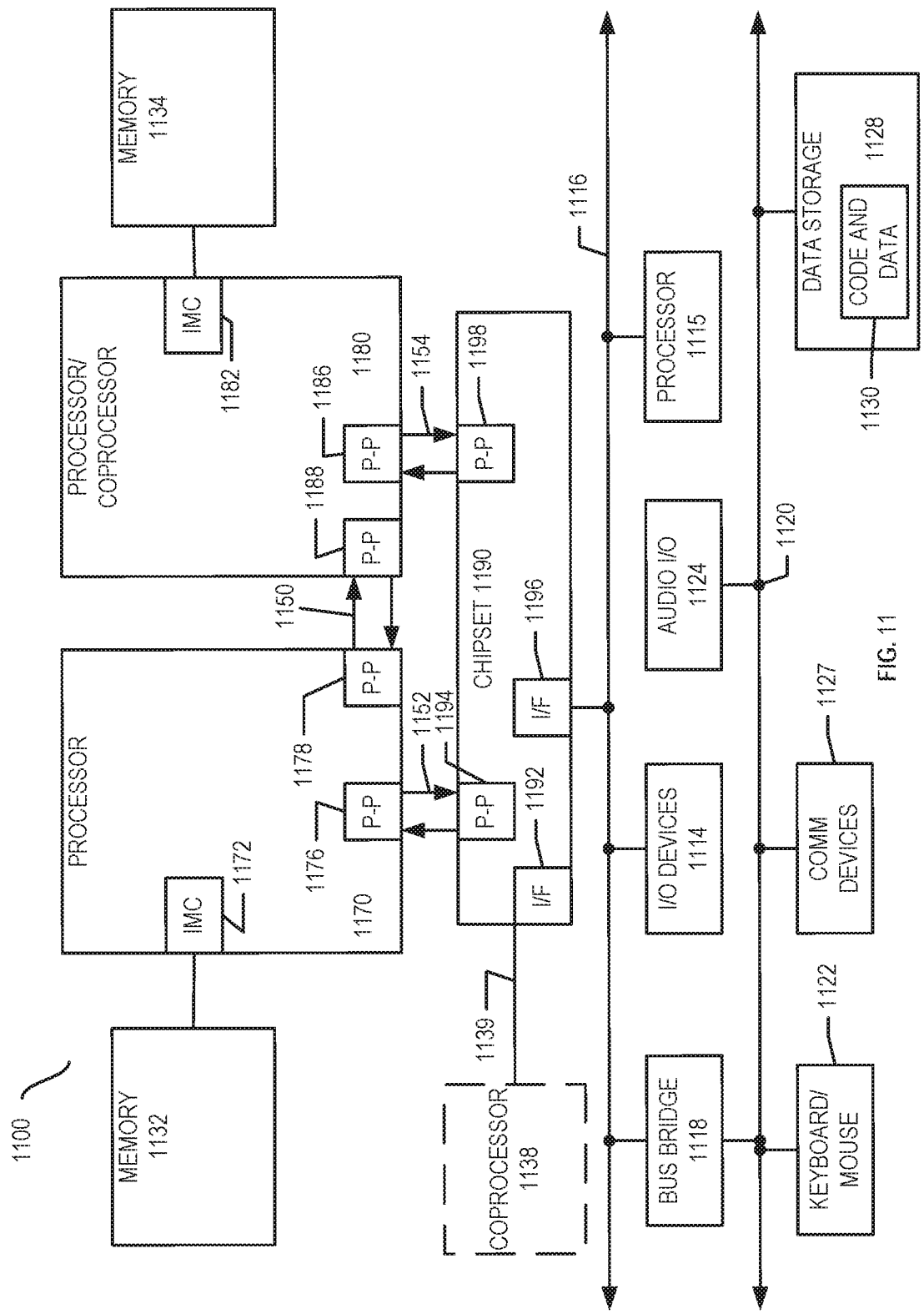

FIG. 11 depicts a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the disclosure, processors 1170 and 1180 are respectively processors 1010 and 1015, while coprocessor 1138 is coprocessor 1045. In another embodiment, processors 1170 and 1180 are respectively processor 1010 and coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are contemplated by this disclosure. For example, instead of the point-to-point architecture of FIG. 11, a system may implement a multi-drop bus or other such architecture.

Figure 12:
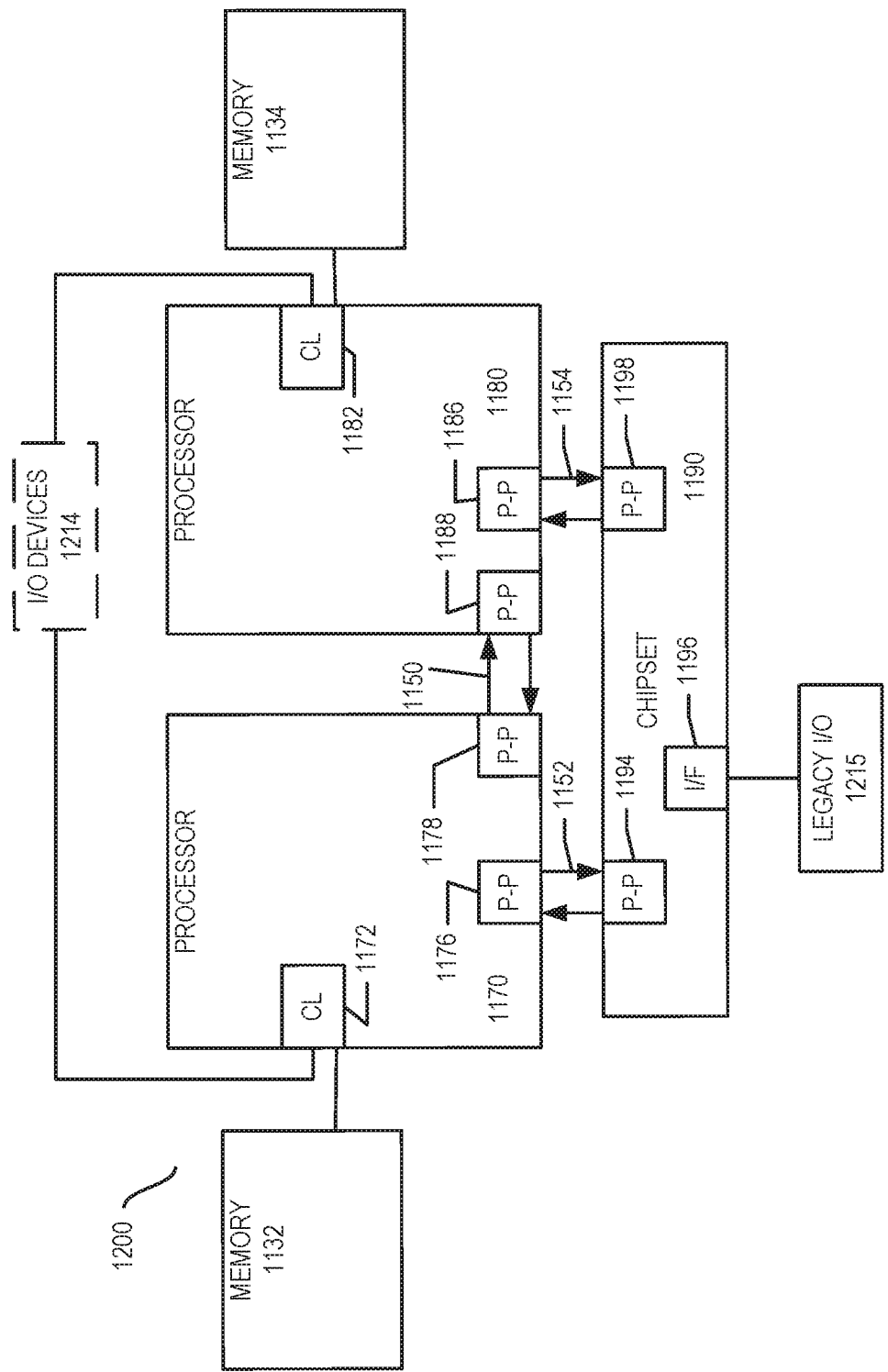

FIG. 12 depicts a block diagram of a second more specific exemplary system 1200 in accordance with an embodiment of the present disclosure. Similar elements in FIGS. 11 and 12 bear similar reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
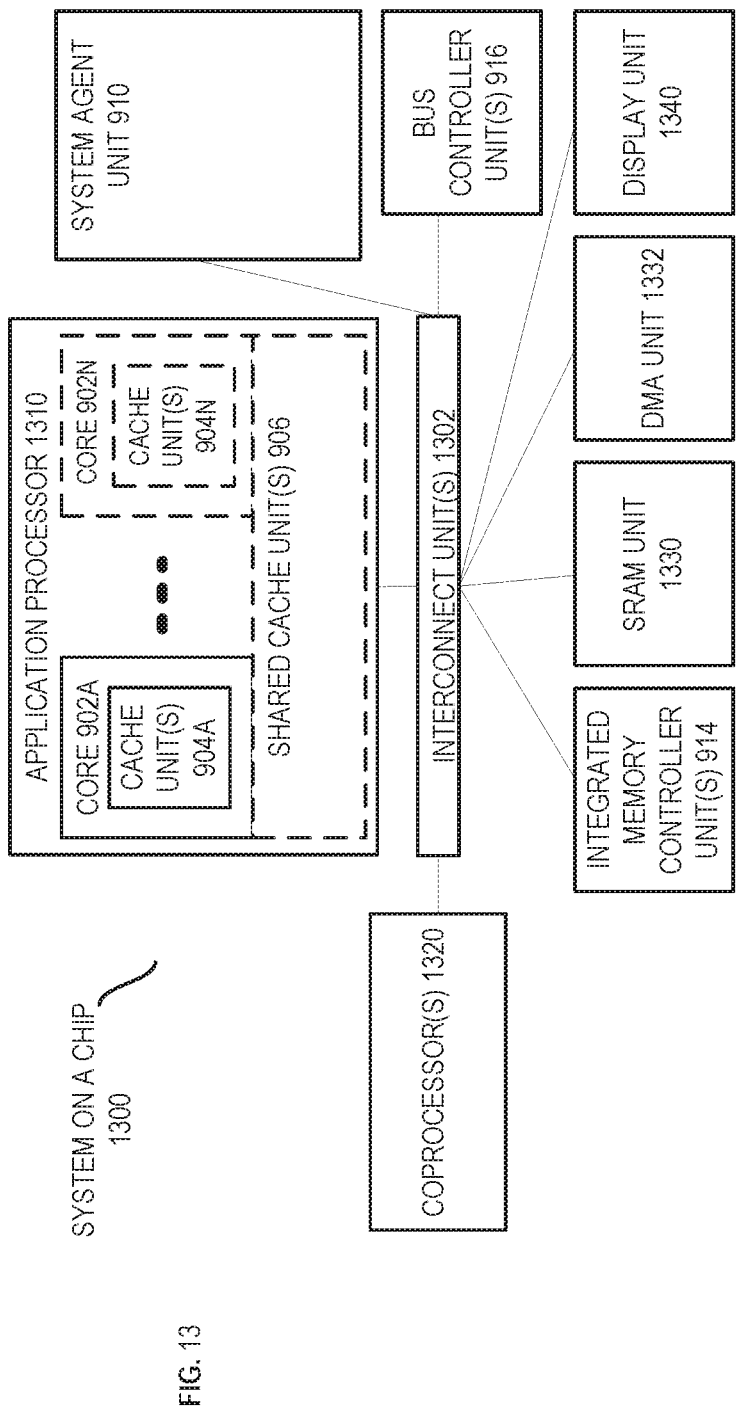

FIG. 13 depicts a block diagram of a SoC 1300 in accordance with an embodiment of the present disclosure. Similar elements in FIG. 9 bear similar reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components such as CPU 102, security processor 104, external I/O controller 106, system memory device 108, storage device 110, cores 112, I/O controller 114, memory controller 116, cryptographic processor 126, key generator 128, encryption/decryption engine 130, platform configuration registers 134, other component described herein, or any subcomponent of any of these components. "Logic" may refer to hardware, firmware, software and/or combinations of each to perform one or more functions. As an example, logic may include hardware, such as a microcontroller or processor, associated with a non-transitory medium to store code adapted to be executed by the microcontroller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, an apparatus comprises a first processor to generate a first cryptographic key in response to a request from a software application; receive a second cryptographic key generated by a second processor; encrypt the first cryptographic key using the second cryptographic key; and provide the encrypted first cryptographic key for use by the software application.

In an embodiment, the first processor is to encrypt the first cryptographic key using a root storage key of the first processor; and decrypt the first cryptographic key using the root storage key prior to encrypting the first cryptographic key using the second cryptographic key. In an embodiment, the apparatus of any of Claims 1-2, wherein the encrypted first cryptographic key is to be provided to the second processor and the second processor is to decrypt the first cryptographic key and use the first cryptographic key to perform a cryptographic operation requested by the software application. In an embodiment, the first processor is to receive the second cryptographic key in an encrypted format from the second processor and to decrypt the second cryptographic key using a third cryptographic key that is stored by the first processor and the second processor. In an embodiment, the first processor is to receive the third cryptographic key in an encrypted format and decrypt the third cryptographic key using a fourth cryptographic key. In an embodiment, the second processor is provisioned with the third cryptographic key at a time of manufacture of the second processor. In an embodiment, the request from the software application includes at least one policy that prevents the first cryptographic key from being sent from the first processor in an unencrypted format. In an embodiment, the first processor is to provide the second cryptographic key to the second processor in response to the second processor resuming a powered state. In an embodiment, the first processor is a trusted platform module and the second processor is a central processing unit. In an embodiment, the first processor is to receive the second cryptographic key over a sideband bus coupled between the first processor and the second processor.

In at least one embodiment, a method comprises generating, by a first processor, a first cryptographic key in response to a request from a software application; receiving a second cryptographic key generated by a second processor; encrypting the first cryptographic key using the second cryptographic key; and providing the encrypted first cryptographic key for use by the software application.

In an embodiment, the method further comprises encrypting the first cryptographic key using a root storage key of the first processor; and decrypting the first cryptographic key using the root storage key prior to encrypting the first cryptographic key using the second cryptographic key. In an embodiment, the method further comprises providing the encrypted first cryptographic key to the second processor and decrypting, by the second processor, the first cryptographic key and using the first cryptographic key to perform a cryptographic operation requested by the software application. In an embodiment, the method further comprises receiving, by the first processor, the second cryptographic key in an encrypted format from the second processor and decrypting the second cryptographic key using a third cryptographic key that is stored by the first processor and the second processor. In an embodiment, the method further comprises receiving by the first processor the third cryptographic key in an encrypted format and decrypting the third cryptographic key using a fourth cryptographic key. In an embodiment, the second processor is provisioned with the third cryptographic key at a time of manufacture of the second processor. In an embodiment, the method further comprises the request from the software application includes at least one policy that prevents the first cryptographic key from being sent from the first processor in an unencrypted format. In an embodiment, the method further comprises providing the second cryptographic key by the first processor to the second processor in response to the second processor resuming a powered state. In an embodiment, the first processor is a trusted platform module and the second processor is a central processing unit. In an embodiment, the method further comprises receiving, by the first processor, the second cryptographic key over a sideband bus coupled between the first processor and the second processor.

In at least one embodiment, an apparatus comprises a first processor to generate a first cryptographic key and provide the first cryptographic key to a second processor; access an encrypted second cryptographic key generated by the second processor, wherein the encrypted second cryptographic key is encrypted using the first cryptographic key; and execute an instruction that references the encrypted second cryptographic key.

In an embodiment, the first processor is to decrypt the encrypted second cryptographic key using the first cryptographic key. In an embodiment, the first processor is to execute the instruction by performing a cryptographic operation on data referenced by the instruction, wherein the cryptographic operation is performed using the second cryptographic key. In an embodiment, the first processor is to encrypt the first cryptographic key using a third cryptograph key that is stored by the first processor and the second processor and to provide the first cryptographic key to the second processor by providing the encrypted first cryptographic key. In an embodiment, the first processor is provisioned with the third cryptographic key at the time of manufacture of the first processor.

In at least one embodiment, a method comprises generating, by a first processor, a first cryptographic key and providing the first cryptographic key to a second processor; accessing an encrypted second cryptographic key generated by the second processor, wherein the encrypted second cryptographic key is encrypted using the first cryptographic key; and executing an instruction that references the encrypted second cryptographic key.

In an embodiment, the method further comprises decrypting, by the first processor, the encrypted second cryptographic key using the first cryptographic key. In an embodiment, the method further comprises executing, by the first processor, the instruction by performing a cryptographic operation on data referenced by the instruction, wherein the cryptographic operation is performed using the second cryptographic key. In an embodiment, the method further comprises encrypting, by the first processor, the first cryptographic key using a third cryptograph key that is stored by the first processor and the second processor and providing the first cryptographic key to the second processor by providing the encrypted first cryptographic key. In an embodiment, the first processor is provisioned with the third cryptographic key at the time of manufacture of the first processor.

In at least one embodiment, a system comprises a first processor to generate a first cryptographic key; and a second processor to generate a second cryptographic key in response to a request from a software application; encrypt the second cryptographic key using the first cryptographic key; and provide the encrypted second cryptographic key for use by the software application. In an embodiment, the second processor is to encrypt the second cryptographic key using a root storage key of the second processor; and decrypt the second cryptographic key using the root storage key prior to encrypting the second cryptographic key using the first cryptographic key. In an embodiment, the first processor is to decrypt the second cryptographic key and use the second cryptographic key to perform a cryptographic operation requested by the software application, the first processor is to encrypt the first cryptographic key using a third cryptographic key stored by the first processor and the second processor and provide the encrypted first cryptographic key to the second processor. In an embodiment, the software application comprises disk encryption software.

In at least one embodiment, a system comprises means for generating a first cryptographic key by a first processor and providing the first cryptographic key to a second processor; means for accessing an encrypted second cryptographic key generated by the second processor, wherein the encrypted second cryptographic key is encrypted using the first cryptographic key; and means for executing an instruction that references the encrypted second cryptographic key. In an embodiment, the system further comprises means for decrypting, by the first processor, the encrypted second cryptographic key using the first cryptographic key. In an embodiment, the system further comprises means for executing the instruction by performing a cryptographic operation on data referenced by the instruction, wherein the cryptographic operation is performed using the second cryptographic key. In an embodiment, the system further comprises means for encrypting the first cryptographic key using a third cryptograph key that is stored by the first processor and the second processor; and means for providing the first cryptographic key to the second processor by providing the encrypted first cryptographic key. In an embodiment, the first processor is provisioned with the third cryptographic key at the time of manufacture of the first processor.

In at least one embodiment, a system comprises means for generating, by a first processor, a first cryptographic key in response to a request from a software application; means for receiving a second cryptographic key generated by a second processor; means for encrypting the first cryptographic key using the second cryptographic key; and means for providing the encrypted first cryptographic key for use by the software application.

In an embodiment, the system further comprises means for encrypting the first cryptographic key using a root storage key of the first processor; and means for decrypting the first cryptographic key using the root storage key prior to encrypting the first cryptographic key using the second cryptographic key. In an embodiment, the system further comprises means for providing the encrypted first cryptographic key to the second processor and means for decrypting, by the second processor, the first cryptographic key and using the first cryptographic key to perform a cryptographic operation requested by the software application. In an embodiment, the system further comprises means for receiving, by the first processor, the second cryptographic key in an encrypted format from the second processor and means for decrypting the second cryptographic key using a third cryptographic key that is stored by the first processor and the second processor. In an embodiment, the system further comprises means for receiving by the first processor the third cryptographic key in an encrypted format and decrypting the third cryptographic key using a fourth cryptographic key. In an embodiment, the second processor is provisioned with the third cryptographic key at a time of manufacture of the second processor. In an embodiment, the request from the software application includes at least one policy that prevents the first cryptographic key from being sent from the first processor in an unencrypted format. In an embodiment, the system further comprises means for providing the second cryptographic key by the first processor to the second processor in response to the second processor resuming a powered state. In an embodiment, the first processor is a trusted platform module and the second processor is a central processing unit. In an embodiment, the system further comprises means for receiving, by the first processor, the second cryptographic key over a sideband bus coupled between the first processor and the second processor.

In at least one embodiment, an apparatus comprising a central processing unit comprising a hardware key; a key generator to generate a wrapping key; and an encryption engine to encrypt the hardware key to generate an encrypted hardware key; and encrypt the wrapping key using the hardware key to generate an encrypted wrapping key;

wherein the central processing unit is to provide the encrypted wrapping key and the encrypted hardware key to a security processor.

In an embodiment, the central processing unit is to access an encrypted cryptographic key to execute an instruction that references the encrypted cryptographic key, the encrypted cryptographic key comprising a cryptographic key generated by the security processor and encrypted by the security processor using the wrapping key. In an embodiment, the central processing unit is to decrypt the encrypted cryptographic key using the wrapping key. In an embodiment, the central processing unit is to execute the instruction by performing a cryptographic operation on data referenced by the instruction, wherein the cryptographic operation is performed using the cryptographic key. In an embodiment, the central processing unit is to generate the wrapping key in response to a booting of the central processing unit.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a first hardware processor; and
   a second hardware processor coupled to the first hardware processor, wherein the first hardware processor is to:
      generate a first cryptographic key in response to a request for generation of a key, the request provided by a software application;
      receive an encrypted wrapping key from the second hardware processor, the encryption of the wrapping key based on a shared cryptographic key, the shared cryptographic key shared by the first hardware processor and the second hardware processor;
      decrypt the encrypted wrapping key;
      encrypt the first cryptographic key using the wrapping key;
      provide the encrypted first cryptographic key for use by the software application;
      encrypt the first cryptographic key using a root storage key of the first processor; and
      responsive to a request by the software application, decrypt the first cryptographic key using the root storage key and then encrypt the first cryptographic key using the wrapping key.

2. The apparatus of claim 1, wherein the encrypted first cryptographic key is referenceable by an instruction from the software application, the instruction requesting a cryptographic operation performable by the second hardware processor, wherein the second hardware processor is to decrypt the first cryptographic key using the wrapping key and use the first cryptographic key to perform a cryptographic operation requested by the instruction from the software application.

3. The apparatus of claim 1, the first hardware processor to receive the wrapping key in an encrypted format from the second hardware processor and to decrypt the wrapping key using the shared cryptographic key.

4. The apparatus of claim 1, the first hardware processor to receive the shared cryptographic key in an encrypted format and decrypt the shared cryptographic key using a second cryptographic key prior to using the shared cryptographic key to decrypt the encrypted wrapping key.

5. The apparatus of claim 4, wherein the second hardware processor is provisioned with the second cryptographic key at a time of manufacture of the second hardware processor.

6. The apparatus of claim 1, wherein the request to generate the key from the software application includes at least one policy that prevents the first cryptographic key from being sent from the first hardware processor in an unencrypted format.

7. The apparatus of claim 1, wherein the first hardware processor is to provide the wrapping key to the second hardware processor in response to the second hardware processor resuming a powered state.

8. The apparatus of claim 1, wherein the first hardware processor is a trusted platform module and the second hardware processor is a central processing unit.

9. The apparatus of claim 1, wherein the first hardware processor is to receive the wrapping key over a sideband bus coupled between the first hardware processor and the second hardware processor.

10. A system comprising:
    a first hardware processor to:
       encrypt a wrapping key; and
    a second hardware processor to:
       generate a first cryptographic key in response to a request for generation of a key, the request provided by a software application;
       receive the encrypted wrapping key from the first hardware processor, the encryption of the wrapping key based on a shared cryptographic key, the shared cryptographic key shared by the first hardware processor and the second hardware processor;
       decrypt the encrypted wrapping key;
       encrypt the first cryptographic key using the wrapping key;
       provide the encrypted first cryptographic key for use by the software application;
       encrypt the first cryptographic key using a root storage key of the second processor; and
       responsive to a request by the software application, decrypt the first cryptographic key using the root storage key and then encrypt the first cryptographic key using the wrapping key.

11. The system of claim 10, wherein, responsive to an instruction provided by the software application, the instruction referencing the encrypted first cryptographic key, the first hardware processor is to decrypt the encrypted first cryptographic key and use the first cryptographic key to perform a cryptographic operation requested by the instruction provided by the software application.

12. The system of claim 10, wherein the first hardware processor is to encrypt the wrapping key using a second cryptographic key stored by the first hardware processor and the second hardware processor and provide the encrypted wrapping key to the second hardware processor.

13. The system of claim 10, wherein the software application comprises disk encryption software.

\* \* \* \* \*